(12) United States Patent
Lobert et al.

(10) Patent No.: US 6,210,796 B1
(45) Date of Patent: Apr. 3, 2001

(54) ADHESIVE PAINT FILM

(75) Inventors: Martin Lobert, Osnabrück; Wolfgang Kranig, Senden; Werner Kluge-Paletta, Buchholz; Michael Kreitz, Neuenkirchen; Stephan Zöllner; Christian Harder, both of Hamburg; Bodo Szonn, Kisdorf, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/043,742

(22) PCT Filed: Sep. 26, 1996

(86) PCT No.: PCT/EP96/04200

§ 371 Date: May 1, 1998

§ 102(e) Date: May 1, 1998

(87) PCT Pub. No.: WO97/11787

PCT Pub. Date: Apr. 3, 1997

(30) Foreign Application Priority Data

Sep. 27, 1995 (DE) ............................................ 195 35 934

(51) Int. Cl.$^7$ ................................. C08F 2/48; C08F 2/50; B32B 7/12; B32B 7/10; B32B 31/28

(52) U.S. Cl. .................... 428/355 R; 428/356; 428/346; 428/343; 156/307.1; 156/307.3; 156/327; 156/83; 156/275.5; 156/275.7; 156/145; 427/508; 427/516; 522/95; 522/97; 522/96

(58) Field of Search ................................... 522/95, 97, 96; 428/424.4, 355 R, 356, 346, 343, 344; 156/307.1, 307.3, 327, 83, 275.5, 275.7, 145; 427/508, 516

(56) References Cited

U.S. PATENT DOCUMENTS

| | | | |
|---|---|---|---|
| 3,532,652 | * | 10/1970 | Zang et al. ....................... 428/355 N |
| 4,335,171 | * | 6/1982 | Zenk ................................. 428/41.4 |
| 4,524,104 | * | 6/1985 | Hagio et al. ....................... 428/341 |
| 4,751,121 | * | 6/1988 | Kuhnel et al. ..................... 428/41.4 |
| 5,229,207 | * | 7/1993 | Paquette et al. ............... 428/355 AC |
| 5,318,835 | * | 6/1994 | Sawamoto et al. ................ 428/317.7 |
| 5,795,650 | * | 8/1998 | Watanabe et al. ............ 428/355 AC |
| 5,877,261 | * | 3/1999 | Harder et al. ........................ 525/123 |

FOREIGN PATENT DOCUMENTS

| | | |
|---|---|---|
| 7241096 | 9/1974 | (DE) . |
| 81 30 861 | 10/1981 | (DE) . |
| 0 547 506 A1 | 12/1992 | (DE) . |
| 30 42 156 C2 | 11/1980 | (EP) . |
| 0 050 794 B2 | 10/1981 | (EP) . |
| 0 230 364 A2 | 1/1987 | (EP) . |
| 0 283 651 A1 | 1/1988 | (EP) . |
| 4-189600 | 7/1992 | (JP) . |
| 97/11922 | * 4/1997 | (WO) . |

* cited by examiner

Primary Examiner—James J. Seidleck
Assistant Examiner—Sanza L. McClendon

(57) ABSTRACT

Adhesive coating film consisting of
a) a radiation-cured coat which comprises
   from 40 to 90% by weight, preferably from 50 to 60% by weight, of urethane acrylate,
   from 0 to 20% by weight, preferably from 10 to 15% by weight, of polyether acrylate,
   from 10 to 50% by weight, preferably from 25 to 40% by weight, of reactive diluent,
   from 0 to 30% by weight of pigments
   from 0 to 10% by weight, preferably from 2 to 5% by weight, of a carboxy-functional (meth)acrylic esther [sic],
   from 0 to 10% by weight of other customary coatings fillers, and
   in the case of curing with UV radiation, from 0 to 10% by weight, preferably from 3 to 6% by weight, of photoinitiator, and
b) which carries on one side an adhesive composition which
   has free NCO groups in the freshly applied adhesive composition,
   can be plastified thermally, especially under the intended processing conditions, and
   has a markedly weak surface tack.

30 Claims, No Drawings

ADHESIVE PAINT FILM

BACKGROUND OF THE INVENTION

The invention relates to an adhesive coating film and to its preparation.

Adhesive coating films are known. For instance, German Utility Model 72 41 096 describes a self-supporting, flexible coating lamina in web or sheet form, which may be provided on one side with a self-adhesive composition, and is covered with a release paper (p. 2, middle), use being made of conventional self-adhesive compositions based on rubber/resin or acrylate (p. 3, bottom). Although such products avoid conventional coating by brushing or dipping and the problems with solvents etc. that such coating entails, they nevertheless have important practical deficiencies in terms of their tack, processability and stability, and such products have, accordingly, been unable to establish themselves.

Products of this kind are also described by DE 30 42 156 C2, which in fact describes a transferable coating sheet for which acrylate resin coating materials, in particular, are applied to a backing film from which these coating materials can then be transferred to the background that is to be coated, a waxlike release layer being intended to facilitate detachment from the backing film, while a self-adhering adhesive is used for bonding the coating material (col. 4, l. 31 ff.). These products too exhibit the above-mentioned deficiencies.

German Utility Model G 81 30 861 discloses a multicoat label which consists of one thin and one thick coat, both of which are electron beam-cured and applied without solvent, the two coats featuring good color contrast. A laser can be used to burn through the upper coat so that the lower coat becomes visible in a contrast color to the upper, in the form of a script mark or the like. A label of this kind can be stuck on by means of a pressure-sensitive, hotmelt or reactive adhesive (p. 2, l. 18), preference being given to the use of pressure-sensitive adhesives. Products of this kind are, however, less suitable for coating surfaces.

EP 230.364 B1 discloses laminates for the transfer of coating materials, in which an at least partly heat-activatable adhesive is employed, having a specific glass transition point and modulus of elasticity. A disadvantage of these products is that they are not radiation-curable.

In addition, EP 283.651 B1 describes coats and coating sheets where the coating material is applied in two or more layers to a radiation-permeable plastic film and is cured by irradiation through this film. These coating sheets of highly complex configuration can be provided with an adhesive layer (p. 4, l. 22/23) comprising free chemically reactive groups and synthetic resin or plastic, especially with a mixture of polyisocyanate and hexamethylenetetramine and an OH-containing PVC copolymer (p. 5, l. 16–24). Disadvantages of such products can be summarized as follows:
solid colors require a two-coat system.
Topcoats are produced with the solventborne coating materials,
topcoats likewise [sic].
As a result of roller application techniques, a preferential direction of the texturing is unavoidable.
It is impossible to achieve all degrees of matt, since the texturing is produced by way of the topcoat and is leveled by the application of the printed layer and of the transparent layer.
The transparent layer is not particularly protected against external contamination by the technique. Clean room conditions are required.

EP 547.506 A1 describes a process for coating aluminum in which a multilayer composite is built up on a carrier film. Finally, an adhesive layer is applied (col. 4, l. 45–53), based on epoxide, polyester, polyurethane, acrylate, urea or the like, with sufficient crosslinker also being employed.

SUMMARY OF THE INVENTION

The object of the invention was to provide an adhesive coating film which does not have the disadvantages of the prior art, or at least not to the same extent.

The invention relates accordingly to an adhesive coating film consisting of
a) a radiation-cured coat which comprises
   from 40 to 90% by weight, preferably from 50 to 60% by weight, of urethane acrylate,
   from 0 to 20% by weight, preferably from 10 to 15% by weight, of polyether acrylate,
   from 0 to 10% by weight, preferably from 2 to 5% by weight, of a carboxy-functional (meth)acrylic ester,
   from 10 to 50% by weight, preferably from 25 to 40% by weight, of reactive diluent,
   from 0 to 30% by weight of pigments
   from 0 to 10% by weight of other customary coatings fillers, and
   in the case of curing with UV radiation, from 0 to 10% by weight, preferably from 3 to 6% by weight, of photoinitiator, and
b) which carries on one side an adhesive composition which
   has free NCO groups in the freshly applied adhesive composition,
   can be plastified thermally, especially under the intended processing conditions, and
   has a markedly weak surface tack.

DETAILED DESCRIPTION OF THE INVENTION

In the text below the constituents of the coat and of the adhesive composition are described in detail:

Urethane acrylate

The urethane acrylates of the invention consist preferably of from 30 to 45% by weight of polyester, with very particular preference from 30 to 40% by weight, from 0.01 to 0.1% by weight of catalysts, from 0.05 to 0.1% by weight of stabilizers, from 10 to 20, preferably from 15 to 20% by weight of hydroxyethyl acrylate, from 15 to 25, preferably from 15 to 20% by weight of reactive diluent and from 20 to 35, preferably from 25 to 35% by weight of a diisocyanate component.

The polyesters employed in accordance with the invention consist of from 50 to 75% by weight, preferably from 55 to 65% by weight, of alcohol and from to 20 to 50, preferably from 30 to 45% by weight of acid and also 5% by weight of customary auxiliaries.

The preparation of the hydroxyl-containing polyester resins takes place in a known manner by esterifying polybasic carboxylic acids with polyhydric alcohols in the presence of appropriate catalysts. Instead of the free acid it is also possible to employ ester-forming derivatives thereof. Examples of alcohols suitable for preparing the polyesters are ethylene glycol, 1,2propylene glycol, 1,3-propylene glycol, 1,2-butanediol, 1,3-butanediol, 1,4-butanediol, 1,5-pentanediol, neopentyl glycol, diethylene glycol, triethylene glycol and also triols, such as glycerol, trimethylolethane, trimethylolpropane and tris-2-hydroxethyl isocyanurate, for example.

Also suitable are cycloaliphatic alcohols, such as cyclohexanols and 1,4-bis(hydroxymethyl)cyclohexane, aromatic alcohols, such as 1,3-xylylenediol, and phenols, such as 2,2-bis(4-hydroxyphenyl)propane (bisphenol A).

Preference is given to the use of mixtures of trimethylolpropane, triethylene glycol, cyclohexanedimethanol.

Also suitable are dihydric aliphatic alcohols, such as 1,4-hexanediol, 1,6-hexanediol, 2-methyl-1,5-pentanediol, 2-ethyl-1,4-butanediol. Dimethylolcyclohexane, trihydric alcohols, such as trimethylolbutane, tetrahydric alcohols, such as pentaerythritol, such as [sic] more highly polyhydric alcohols, such as di(trimethylolpropane), di(pentaerythritol) and sorbitol.

Examples of suitable carboxylic acids are phthalic acid, isophthalic acid, terephthalic acid and their esterifiable derivatives, such as the anhydrides, for example, provided they exist, and the lower alkyl esters of said acids, such as, for example, methyl, ethyl, propyl, butyl, amyl, hexyl and octyl phthalates, terephthalates and isophthalates. The monoesters, the dialkyl esters and mixtures of these compounds can be employed. Also employable are the corresponding acid halides of these compounds. Preference is given to mixtures of phthalic anhydride, isophthalic acid and adipic acid.

Aliphatic and/or cycloaliphatic diisocyanates are suitable for preparing the urethane acrylate, examples being 1,3-cyclopentane, 1,4-cyclohexane and 1,2-cyclohexane diisocyanate, 4,4'-methylenebis(cyclohexyl isocyanate) and isophorone diisocyanate, trimethylene, tetramethylene, pentamethylene, hexamethylene and trimethylhexamethylene 1,6-diisocyanate, and also the diisocyanates described in EP-A-204 161, column 4, lines 42 to 49, that are derived from dimeric fatty acids.

Preferably, isophorone diisocyanate is added onto the hydroxy-functional polyester. By addition reaction of hydroxyl-containing acrylic esters and/or methacrylic esters, such as hydroxyethyl acrylate or hydroxybutyl acrylate, with mono- and/or oligomers containing isocyanate groups, the polyurethane acrylates and/or methacrylates are obtained.

So that no unwanted polymerization occurs in the course of the addition reaction, polymerization inhibitors are generally added, as stabilizers, to the reaction mixture. The suitable polymerization inhibitors include known products, such as substituted phenols, such as 2,6-di-tert-butyl-p-cresol, hydroquinones, such as methylhydroquinones, and thioethers, such as thiodiglycol or phenothiazine.

Polyether acrylate

The polyether acrylate used in accordance with the invention consists of from 50 to 75% by weight, preferably from 55 to 65 by weight, of a polyetherpolyol, from 20 to 50% by weight, preferably from 30 to 45% by weight, of acrylic acid, and 5% by weight of customary auxiliaries.

The polyetherpolyols involved preferably have an OHN of 290 mg of KOH/g, a molecular weight of 800 and a viscosity of 500 mPas.

The hydroxyl-containing polyethers which are esterified with acrylic acid and/or methacrylic acid are obtained by reacting dihydric and/or polyhydric alcohols with various amounts of ethylene oxide by well-known methods (cf. e.g. Houben-Weyl, Volume XIV, 2, Makromolekulare Stoffe II, (1963) The ether alcohols employed generally have a degree of ethoxylation of from 10 to 20, preferably from 13 to 17. Preferably employed is ethoxylated erythritol with a molecular weight of from 500 to 1,000, preferably from 700 to 900. One example is pentaerythritol etherified with 15 etoxy [sic] units.

Reactive diluent

Depending on the viscosity of the esters, the radiation-curable coating compositions may comprise reactive diluents, preferably copolymerizable compounds known for use in radiation-curable coating compositions, for example (meth)acrylic esters, especially methyl (meth)acrylate, ethyl (meth)acrylate, propyl (meth)acrylate, butyl (meth)acrylate, isopropyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth) acrylate, decyl (meth)acrylate, hexadecyl (meth)acrylate, octadecyl (meth)acrylate, octadecenyl (meth)acrylate, phenoxy-ethyl acrylate and the corresponding esters of maleic, fumaric, tetrahydrophthalic, crotonic, isocrotonic, vinylacetic and itaconic acid. Preference is given to the use of monomers having more than one double bond per molecule, examples being ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6hexamethylene glycol diacrylate, 1,10-decamethylene glycol diacrylate, trimethylolpropane triacrylate, pentaerythritol tetraacrylate and pentaerythritol triacrylate, and also the corresponding methacrylates. Also suitable are the ethoxylated or propoxylated derivatives, and the long-chain linear diacrylates described in EP-A-250 631 which have a molecular weight of from 400 to 4,000, preferably from 600 to 2,500. The two acrylate groups can be separated, for example, by a polyoxybutylene structure. Also employable are 1,12-dodecyl diacrylate and the reaction product of two moles of acrylic acid with one mole of a dimeric fatty alcohol having generally 36 C atoms. very particular preference is given to the use of isobornyl acrylate, trimethylolpropane triacrylate and acrylic esters of ethoxylated pentaerythritol.

The addition of ethylenically unsaturated compounds controls the viscosity and the curing rate of the coating compositions and also the mechanical properties of the resulting coating, as is familiar to the skilled worker and is described, for example, in EP-A-223 086, to which reference is made for further details.

The photoinitiator, which is customarily employed in the coating compositions of the invention in an amount of from 0 to 10% by weight, preferably from 3 to 6% by weight, based on the overall weight of the coating compositions, varies with the radiation that is employed to cure the coating materials (UV radiation,. electron beams, visible light). The coating compositions of the invention are preferably cured by means of electron beams. In the case of the use of UV radiation it is common to employ ketone-based photoinitiators, by way of example acetophenone, benzophenone, diethoxy-acetophenone, 2-hydroxy-2-methyl-1-phenylpropan-1-one, hydroxypropyl phenyl ketone, m-chloroacetophenone, propiophenone, benzoin, benzil, benzil dimethyl ketal, anthraquinone, thioxanthone and thioxanthone derivatives, and triphenylphosphine and the like, and also mixtures of various photoinitiators.

Other additives

The coating compositions may, if desired, also comprise pigments and customary coatings fillers, customary auxiliaries and additives. The former are employed in amounts of from 0 to 30% by weight. The proportion of customary coatings fillers is from 0 to 10% by weight. Auxiliaries and additives are usually employed in an amount. of from 0 to 4% by weight, preferably from 0.5 to 2.0% by weight, based in each case on the overall weight of the coating composition. Examples of such substances are leveling agents, plasticizers, defoamers and, in particular, adhesion promoters. Adhesion promoters employed here are alkoxysilanes, such as, for example, N-β-aminoethyl-, -aminopropyltrimethoxysilane, -aminopropyltrimethoxysilane, N-methyl-β-aminopropyltrimethoxysilane or triamino-modified propyltrimethoxysilane (e.g. adhesion promoter DYNASLYAN[R] [sic], "Type TRIAMO", commercial product of Dynamit Nobel Chemie).

As additional adhesion promoters it is possible to use from 0 to 10, preferably from 0 to 5% by weight of a carboxy-functional (meth)acrylic ester. Examples are β-carboxyethyl acrylate and EBECRYL 169 or 170 which can be obtained from UCB, S. A., Drogenbos, Belgium.

Using the coating films

The curing of the coating films is carried out by means of radiation, preferably by means of electron beams. The apparatus and conditions for these curing methods are known from the literature (cf. e.g. R. Holmes, U.V. and E.B. Curing Formulations fur [sic] Printing Inks, Coatings and Paints, SITA Technology, Academic Press, London, United Kingdom 1984) and require no further description.

The curing of the coating films takes place directly after application or following the evaporation of water that is present, by means of UV or electron beams. The apparatus and conditions for these curing methods are known from the literature (cf. e.g. R. Holmes, U.V. and E.B. Curing Formulations for Printing Inks, Coatings and Paints, SITA-Technology, Academic Press, London, United Kingdom 1984, pages 79–111) and require no further description.

The adhesive coating film of the invention is particularly suitable for coating planar and weakly three-dimensionally formed surfaces using a hot press. In this case there is no use of liquid coating materials on customary coating lines and hence no costly measures such as, for example, recovery or incineration of solvents, and no problems for the handling, the transportation, the storage and the disposal of hazardous substances and for personal protection In comparison with sheet-coated articles, there is an increase in the utility and in the nonmaterial value thereof through improvement of the thermal stability and chemical resistance and of the production of a surface having an appearance and feel typical of a coating. Moreover, there is substantial avoidance of the pollution of the air in the room by retained solvents and monomers, where articles coated with adhesive coating film are used, owing to the use of radiation-curable coating materials, especially electron beam-curable coating materials.

The coating film of the invention is particularly suitable for coating workpieces made, for example, from MDF (medium density fiberboard), and in terms of its chemical resistance in accordance with DIN 68861 Part 1 it meets the conditions of resistance group 1A with respect to acetone, but at least those of resistance group 1B. In the crosshatch test in accordance with DIN 53151 at least the characteristic value Gt 2C is reached, and the flexibility is sufficient in order to allow hot pressing around a rounded edge without breaking.

Adhesive

The connection of the adhesive layer (adhesive) on the self-supporting coating film to said self-supporting coating film, on the one hand, and to the surface of the workpiece, on the other hand, is sufficiently firm, following the hot-pressing of the adhesive coating film, that when a self-adhesive tape stuck on forcefully and left for 72 hours is peeled off sharply there is no adhesive fracture.

The acrylate adhesive used is, in particular, an internally crosslinkable and, through the admixture of a polyfunctional isocyanate, externally reactive copolymer comprising softening and hardening acrylate monomers and with a markedly weak surface tack (controlled tack).

The adhesive can be applied to the cured coating film by spreading it from solution on a coating unit using a coating knife, and evaporating the solvents in a drying tunnel.

Good adhesion of the adhesive to the coating material can be achieved by blending the adhesive with from 0.5 to 3, especially 1–2% by weight of an isocyanate having an isocyanate content of from 20 to 24% by weight and partially reacting the isocyanate with free functional groups of the coating material, during the drying of the adhesive on the coating surface and during the storage of the finished product. As the free functional groups of the coating material, OH groups, preferably COOH groups, have been found most effective. To improve the anchoring of the acrylate copolymer on the coating material it has also been found advantageous for this copolymer to be dissolved in a solvent, which swells the coating surface in the course of coating. As solvents for this purpose, ketones are particularly suitable.

The adhesion of the adhesive on the coating surface is advantageously improved by subjecting said surface to corona pre-treatment.

A sufficient adhesion of the adhesive-treated coating film to the substrate (surface of the workpiece) can be achieved by hot pressing on the workpiece at a temperature of from 120 to 160° C., preferably from 135 to 150° C., and a pressure of from 10 to 50 bar, preferably from 20 to 40 bar, and over a period of from 1 to 4 minutes, preferably from 2 to 3 minutes.

The adhesive can be crosslinked by forming a salt from is the central metal atom of a chelate complex with the free carboxyl groups of the copolymerized acrylic acid at temperatures of 100° C. or more. The proportion of acrylic acid is, in particular, between 3 to [sic] 8% by weight. An inner complex based on acetyl acetone, formed with titanium or aluminum, can be used as crosslinking agent. From 0.1 to 0.6, in particular, and preferably from 0.1 to 0.4% by weight of this agent are employed.

The further crosslinking can take place by partial reaction of the isocyanate, optionally incorporated into the adhesive by mixing, with its acidic groups.

The crosslinking of the adhesive should be sufficiently high that there is no shearing of said adhesive under slight stresses which may build up within the coating film as a result of pressing.

The reduced surface tack (controlled tack) of the acrylate copolymer can be obtained by copolymerizing from about 15 to 50% of tertiary butyl acrylate and/or from 5 to 30% of methyl methacrylate, depending on the desired extent of the controlled tack.

Preparation

1. Coating of an auxiliary backing, preferably polyester film, in a thickness of from 35 to 100 $\mu$m, preferably 50 $\mu$m, with an (electron) beam-curable coating material in a coat thickness of from 40 to 100 μm, preferably from 70 to 80 μm. Crosslinking of the coating, in particular on an EBC unit of the scanner type at from 50 to 100 kGy, preferably 80 KGy [sic]. The accelerator voltage is about 350 kV.

The auxiliary backing can have a glossy or a matt surface. Accordingly, the subsequent visible side of the coating film will be either glossy or matt. The auxiliary backing can easily be peeled off from the coating surface, but should remain thereon in particular until after the pressing of the adhesive coating film.

2. Coating of the free coating surface with an adhesive in a coat thickness of from 25 to 70 μm, preferably from 30 to 40 μm.

3. In the case of the use of an adhesive having a tacky surface, covering thereof with an antiadhesively treated paper or with a corresponding film.

As the adhesive it is also possible to employ a two-pack laminating adhesive, especially one which in the finally crosslinked state represents a non-self-adhesive, weakly crosslinked polyurethane which is still heat-plastifiable. It is preferably prepared from a prepolymer which contains isocyanate groups, and which is mixed with an at least bifunctional alcohols [sic] based on ether or ester, preferably with a polyetherol having a hydroxyl content of from 20 to 32%, and after coating is crosslinked in situ on the coating surface. In the course of this crosslinking, the free isocyanate groups of the prepolymer react partially with functional groups of the coating surface.

The two-pack laminating adhesive is in particular a prepolymer which contains isocyanate groups and which is crosslinked with a diol. Crosslinking can take place in situ on the coating surface partially during the drying of the adhesive, but mainly during the storage. of the ready-prepared adhesive coating film.

The two-pack laminating adhesive used can in particular be one comprising a prepolymer which contains isocyanate groups, is to be brought to reaction with diethylene glycol and is based on a polyester urethane comprising an aromatic isocyanate and with an isocyanate content of from 3 to 4%. The mixing ratio of prepolymer to diethylene glycol is preferably 50 to 1 (parts by weight). The two-pack laminating adhesive is preferably dissolved/employed at a strength of 60% in ethyl acetate.

In particular, the two-component laminating adhesive has undergone final crosslinking even prior to pressing. The effect of its balanced crosslinking density is firstly to allow sufficient wetting of the surface of the workpiece in the course of pressing and secondly means that its cohesion is sufficiently high at the temperature at which the workpiece is subsequently used. The two-pack adhesive can also be a prepolymer in the above sense which contains isocyanate groups and is crosslinked with a phenolic resin/epoxy resin condensate. In this case there is partial crosslinking of the adhesive during drying on the coating surface and during subsequent storage of the product, as a result of reaction of the free isocyanate groups of the prepolymer with the secondary hydroxyl groups of the phenolic resin/epoxy resin condensate. In this case the free isocyanate groups of the prepolymer react partly with the functional groups of the coating material. The ultimate crosslinking of the adhesive, which up to that point is still heat-plastifiable, takes place in the course of the subsequent pressing of the product at relatively high temperatures, as a result of reaction of the epoxide groups with those molecular segments of the adhesive that carry active hydrogen atoms. At the same time there are likewise adhesion-promoting reactions with the coating surface. Otherwise, with regard to processing, configuration of products employed and other details, reference is made to the other exemplary indications.

In the text below the invention is described further with reference to the examples.

A. Preparing the coating material

EXAMPLE 1

39.8 parts of the urethane acrylate of the invention, 80% in phenoxyethyl acrylate, 9.9 parts of acrylicized polyol, 14.9 parts of isobornyl acrylate, 9.9 parts of ethoxyllated penthaerythritol tetracrylate [sic], 24.9 parts of $TiO_2$ pigment, 0.3 parts of emulsifier, 0.3 parts of dispersing auxiliary.

The components are weighed out into the containers customary in the coatings industry and are combined using a dissolver.

EXAMPLE 2

61.5 parts of the urethane acrylate of the invention are charged to a vessel and at 50° C. are mixed with 13.4 parts of polyether acrylate. At 50° C., 7.2 parts of vinylcaprolactam, 10 parts of isobornyl acrylate, are stirred in in the stated sequence.

The following process steps are carried out under the exclusion of direct incident sunlight. At 50° C., 4 parts of aliphatic urethane acrylate [lacuna] stirred in. Subsequently, [lacuna] with 3.4 parts of isobornyl acrylate. The mixture is subsequently adjusted to a viscosity of 6,900+/–1,500 mPaS [sic] (23° C.). The resin solution is stirred thoroughly at 50° C. for one hour more, filtered hot through a 1 μm filter, and dispensed.

EXAMPLE 3

64.9 parts of the urethane acrylate of the invention are charged to a vessel. At 50° C., 6 parts of vinylcaprolactam, 3.8 parts of tripropylene glycol diacrylate and 16 parts of hexanediol diacrylate are stirred in in the stated sequence. The following process steps are carried out under exclusion of direct incident sunlight:

At 50° C., aliphatic urethane acrylates are stirred in (4 parts) and the mixture is adjusted with 4.B parts of hexanediol diacrylate to a viscosity of 6,500+/–1,500 mPaS [sic].

The resin solution is subsequently stirred thoroughly at 50° C. for one hour, filtered through a 1 μm filter, and dispensed.

EXAMPLE 4

55 parts of the urethane acrylate of the invention are charged to a vessel and are mixed at 50° C. with an aliphatic urethane acrylate (8 parts). At 50° C., 5.5 parts of tripropylene glycol diacrylate, 7 parts of vinylcaprolactam, 16 parts of isobornyl acrylate are stirred in in the stated sequence.

With exclusion of direct incident sunlight, 4 parts of aromatic isobornyl acrylate are stirred in at 50° C. in the stated sequence. With exclusion of direct incident sunlight, 4 parts of aromatic urethane acrylate are stirred in at 50° C., and the mixture is adjusted with 4 parts of isobornyl acrylate to a viscosity of 7,500+/–1,500 mPaS [sic]. The resin solution is subsequently stirred at 50° C. for one hour, filtered hot through a 1 μm filter, and dispensed.

EXAMPLE 5

54.3 parts of the urethane acrylate of the invention are charged to a vessel and mixed at 50° C. with 7.9 parts of aliphatic urethane acrylate. At 50° C., 5.3 parts of tripropylene glycol diacrylate, 7 parts of vinylcaprolactam, 17 parts of isobornyl acrylate are stirred in in the stated sequence. With exclusion of sunlight, a photoinitiator is stirred in at 50° C. (4 parts) and the mixture is adjusted with 4 parts of isobornyl acrylate to a viscosity of 7,500+/−1,500 mPaS [sic].

The resin solution is subsequently stirred thoroughly at 50° C. for one hour, filtered hot through a 1 μm filter, and dispensed.

B. Preparing the coating film

1. A matt polyethylene terephthalate film having a reflectometer value of 35 measured at an incident angle of 60° and having a thickness of 50 μm is coated on a coating unit by means of a doctor blade with a solvent-free, electron beam-curable coating material in accordance with Examples 1–5 in a coat thickness of 80 μm.

2. The polyethylene terephthalate film coated with the liquid, solvent-free coating material is supplied to an electron beam unit of the scanner type where the coating material, without cooling, is cured under inert gas with 80 kGy at an accelerator voltage of 350 kV.

3. The free coating surface of the resulting, readily detachable coating/film laminate is coated with an adhesive in a coat thickness of 30 μm either immediately in-line or separately by means of a doctor blade. Prior to the application of the adhesive, the coating surface is subjected to a corona pretreatment.

4. The adhesive is an acrylate copolymer comprising n-butyl acrylate with 5% by weight of acrylic acid. In order to prevent the disruptive surface tack, the monomers are copolymerized with 20% by weight of tert-butyl acrylate and 15% by weight of methyl methacrylate. For the internal crosslinking of the adhesive an amount of 0.4% by weight of aluminum acetylacetonate is added to the copolymer, and 1% of a polyfunctional polyisocyanate, prepared by trimerizing hexamethylene isocyanate and having an isocyanate content of 21% by weight, is added to the blend in order to increase its reactivity with respect to the coating surface. The adhesive is employed as a 20% strength by weight solution and as solvents contains acetone and isopropanol in a ratio of 3:1.

5. The coating material coated with an adhesive subsequently passes through a drying tunnel in which the solvents are evaporated over a period of from 1 to 4 minutes at a temperature of from 70 to 100° C.

6. The dried, only partly crosslinked and still largely isocyanate-reactive adhesive is covered with a siliconized paper or with a siliconized polyethylene film.

7. The resulting composite product is wound up into a roll and can be stored. In the course of storage, the adhesion-promoting reaction takes place between the free isocyanate in the adhesive and the functional groups of the coating material.

C. Coating example

An adhesive coating film produced in this way can be joined permanently to the surface of a medium density fiberboard as follows:

1. The adhesive coating film is cut to the size of the workpiece that is to be coated.

2. The covering paper or the covering film are [sic] removed.

3. The adhesive coating film is placed onto the medium density fiberboard workpiece, with the adhesive side facing the side of the workpiece that is to be coated. Since the adhesive possesses a controlled tack, it is easy to position and correct the adhesive coating film. The polyester film is not removed from the visible side of the coating material.

4. Then, the adhesive coating film is pressed onto the medium density fiberboard at 40 bar and 150° C. for 3 minutes using a flatbed press.

The partly crosslinked but still flowable acrylate polymer, which under the application of pressure wets the surface of the workpiece, undergoes its actual crosslinking in the course of pressing at the specified temperature and hence acquires the cohesion necessary for the subsequent service of the workpiece.

5. Following the pressing and the cooling of the workpiece, the matt polyester film can be peeled off from the visible side of the coating material. It is advisable, however, not to remove the polyester film from the coating surface of the coated workpiece during its subsequent handling, since the film is able to ideally protect said surface up to the point of final use.

6. A coated workpiece is obtained which has a flawless, matt surface which meets the specified requirements.

What is claimed is:

1. An adhesive coating film consisting of
   a) a radiation-cured coat comprising
      from 40 to 90% by weight of urethane acrylate,
      from 0 to 20% by weight of polyether acrylate,
      from 10 to 50% by weight of reactive diluent,
      from 0 to 30% by weight of pigments of a carboxy-functional (meth)acrylic ester,
      from 0 to 10% by weight of other customary coatings fillers, and
      from 0 to 10% by weight of photoinitiator, and
   b) the radiation cured coat having on one side an adhesive composition, the adhesive composition comprising free NCO groups when freshly applied, controlled surface tack, and the ability to be thermally plastified.

2. The adhesive coating film of claim 1, consisting of the reactive diluent comprises a member selected from the group consisting of vinylcaprolactam, tripropylene glycol diacrylate, hexanediol diacrylate, isobornyl acrylate, trimethylolpropane triacrylate, pentaerythritol tetraacrylate, ethoxylated derivatives thereof, propoxylated derivatives thereof, and mixtures therof.

3. The adhesive coating film of claim 1, consisting of the urethane acrylate consisting of
   from 30 to 45% by weight of polyester,
   from 0.01 to 0.1% by weight of catalyst,
   from 0.05 to 0.1% by weight of stabilizer,
   from 10 to 20% by weight of hydroxyethyl acrylate,
   from 15 to 25% by weight of reactive diluent and
   from 20 to 35% by weight of diisocyanate components.

4. The adhesive coating film of claim 3, consisting of the polyester consisting of
   from 50 to 75% by weight of alcohol,
   from 20 to 50% by weight of acid, and 5% by weight of customary auxiliaries.

5. The adhesive coating film of claim 1, consisting of the polyether acrylate consisting of
   from 50 to 75% by weight of a polyether polyol,
   from 20 50% by weight of acrylic acid, and
   5% by weight of customary auxiliaries.

6. The adhesive coating film of claim 5, wherein the polyether polyol consists of an ethoxylated erythritol having a molecular weight of from 500 to 1,000.

7. The adhesive coating film of claim 1, wherein the adhesive composition comprises an acrylate adhesive consisting of an internally crosslinkable and externally reactive copolymer comprising softening and hardening acrylate monomers.

8. The adhesive coating film of claim 1, wherein the adhesive composition comprises a two-pack laminating adhesive.

9. The adhesive coating film of claim 1, consisting of the radiation-cured coat comprising free functional groups.

10. The adhesive coating film of claim 7, wherein the acrylate adhesive comprises 2.5–8% by weight of acrylic acid.

11. The adhesive coating film of claim 7, wherein the acrylate adhesive comprises a member selected from the group consisting of from 15 to 50% by weight of copolymerized tertbutyl acrylate, from 5 to 30% by weight of copolymerized methyl methacrylate, and mixtures thereof.

12. The adhesive coating film of claim 7, wherein the acrylate adhesive comprises 0.1–0.6% by weight of a metal chelate complex.

13. The adhesive oating film of claim 7, wherein the acrylate adhesive 0.5–3% by weight of a polyfuctional polyisocyanate.

14. A process for producing the adhesive coating film of claim 1,
coating an auxiliary backing with a radiation-curable coating material,
curing the coating material by radiation to provide a free coated surface,
coating the free coated surface with an adhesive.

15. A method of coating a substrate, comprising
providing the adhesive coating film of claim 1,
providing a substrate selected from the group consisting of metal, plastic, paper, cardboard, wood, glass, glass fibers and mixtures thereof, and
applying the adhesive coating film to the substrate.

16. An adhesive coating film consisting of
a) a radiation-cured coat comprising
from 50 to 60% by weight of urethane acrylate,
from 10 to 15% by weight of polyether acrylate,
from 25 to 40% by weight of reactive diluent,
from 2 to 5% by weight of a carboxy-functional (meth) acrylic ester,
from 0 to 10% by weight of other customary coatings fillers, and
from 3 to 6% by weight of photoinitiator, and
b) the radiation cured coat having on one side an adhesive composition, the adhesive composition comprising free NCO groups when freshly applied, controlled surface tack, and the ability to be thermally plastified.

17. The adhesive coating film of claim 16 wherein the radiation cured coat is cured with UV radiation.

18. The adhesive coating film of claim 4, consisting of the polyester consisting of
from 55 to 65% by weight, of alcohol,
from 30 to 45% by weight of acid, and
5% by weight of customary auxiliaries.

19. The adhesive coating film of claim 5, consisting of the polyether acrylate consisting of
from 55 to 65% by weight, of a polyether polyol,
from 30 to 45% by weight, of acrylic acid, and
5% by weight of customary auxiliaries.

20. The adhesive coating film of claim 6, wherein the polyether polyol consists of an ethoxylated erythritol having a molecular weight of from 700 to 900.

21. The adhesive coating film of claim 8, wherein the adhesive composition comprises a two-pack laminating adhesive which is a weakly crosslinked polyurethane which is non-self-adhesive and still plastifiable in the final crosslinked state.

22. The adhesive coating film of claim 9, consisting of the radiation-cured coat comprising free functional groups selected from the group consisting of OH groups, COOH groups and mixtures thereof.

23. The adhesive coating film of claim 10, wherein the acrylate adhesive comprises 2.5–5% by weight of acrylic acid.

24. The adhesive coating film of claim 11, wherein the acrylate adhesive comprises a member selected from the group consisting of from 20 to 40% by weight of copolymerized tertbutyl acrylate, from 10 to 15% by weight of copolymerized methyl methacrylate, and mixtures thereof.

25. The adhesive coating film of claim 12, wherein the acrylate adhesive comprises 0.1–0.4% by weight of a metal chelate complex selected from the group consisting of a titanium chelate complex, an aluminum chelate complex or mixtures thereof.

26. The adhesive coating film of claim 25, wherein the acrylate adhesive comprises aluminum acetylacetonate.

27. The adhesive coating film of claim 13, wherein the acrylate adhesive comprises 1–2% by weight of a polyisocyanate obtained by trimerizing hexamethylene diisocyanate and having an isocyanate content of 20–24% by weight.

28. The process of claim 14, further comprising removing the auxiliary backing.

29. The process of claim 28, wherein the auxiliary backing is removed prior to the coating with adhesive.

30. The process of claim 28, wherein the auxiliary backing is removed after the coating film is adhesively bonded.

* * * * *